F. J. QUIST & M. BLANCH.

VACUUM SWEEPER.

APPLICATION FILED APR. 24, 1911.

Reissued Jan. 7, 1913.

13,508

Witnesses:

C. F. Nesson

E. M. Allen

Inventors

F. Julius Quist

Malcolm Blanch by Attorneys

Southgate & Southgate

UNITED STATES PATENT OFFICE.

FRANK JULIUS QUIST AND MALCOLM BLANCH, OF WORCESTER, MASSACHUSETTS, ASSIGNORS TO DOMESTIC VACUUM CLEANER COMPANY, OF WORCESTER, MASSACHUSETTS, A CORPORATION OF MASSACHUSETTS.

VACUUM-SWEEPER.

13,508. Specification of Reissued Letters Patent. Reissued Jan. 7, 1913.

Original No. 976,494, dated November 22, 1910, Serial No. 573,128. Application for reissue filed April 24, 1911. Serial No. 623,127.

*To all whom it may concern:*

Be it known that we, FRANK JULIUS QUIST and MALCOLM BLANCH, citizens of the United States of America, residing at Worcester, in the county of Worcester and Commonwealth of Massachusetts, have invented a new and useful Vacuum-Sweeper, of which the following is a specification.

Our invention relates to improvements in pneumatic cleaners and consists in the peculiar construction, arrangement, and combination of parts as more fully hereinafter described.

An object of our invention is to provide a pneumatic sweeper in which the suction creating device is automatically operated by the wheels of the sweeper being set in motion by the stroke of the sweeper over any surface by means of a handle.

Further objects thereof are to provide a compact arrangement of the motors, wheels, and dust receiver, whereby they can be contained in a small space and covered by a small and neat casing having no projections liable to injure furniture when in operation; to provide an improved location and arrangement of motors whereby the suction will be continuous; and to provide a convenient way of removably holding the dust bag in position.

Figure 1:
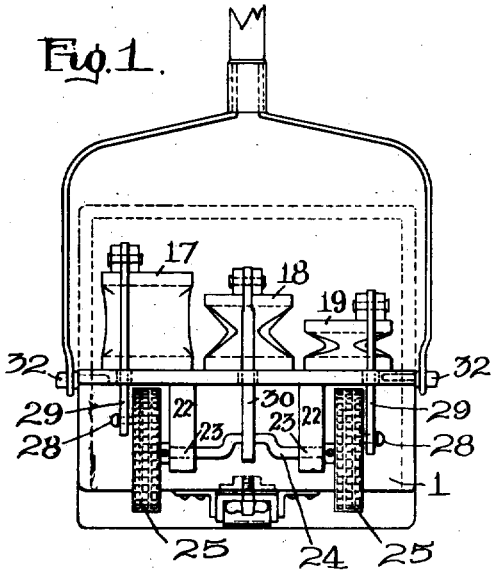
Figure 2:
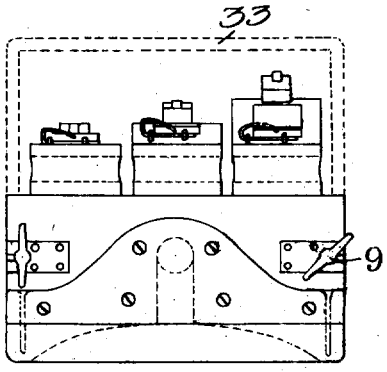
Figure 3:
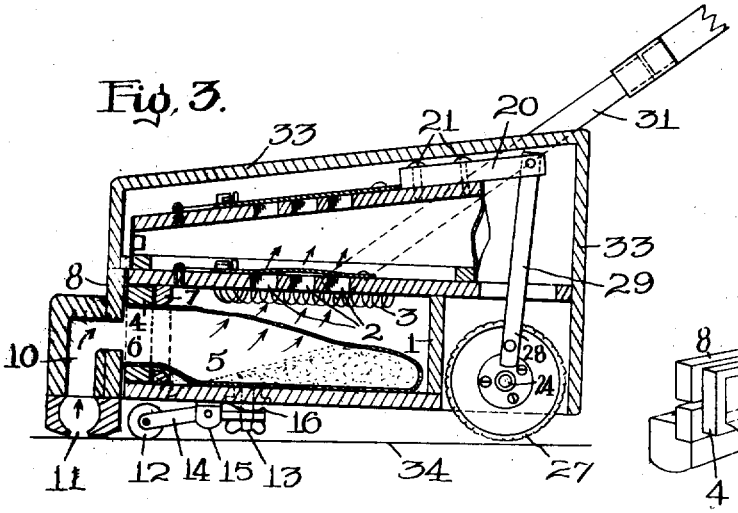
Figure 4:
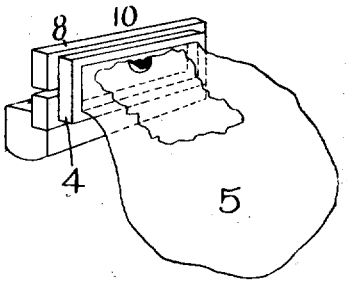

In the drawing, Figure 1 is a rear view of the invention with the cover removed. Fig. 2 is a view of the front end of the same; Fig. 3 is a vertical longitudinal section of the same. Fig. 4 is a view of the nozzle head and a section of the dust receptacle.

Similar numbers refer to similar parts throughout the several views.

Referring to the drawing, 1 is the casing having the apertures 2 protected by the screen 3. The removable dust receptacle frame 4 having attached to it the dust receptacle 5 is adapted to fit into the open end 6 of the casing 1 against the strip 7 attached to the casing 1. The nozzle head 8 is adapted to cover the end 6 of the casing 1 and be held in position or loosened by means of the thumb screws 9. Thus it holds the frame 4 in position. The nozzle head 8 has the duct 10 and the horizontal elongated inlet 11. The casing has a low compartment for the dust bag or receptacle located along the bottom thereof. The casing 1 has the roller 12 vertically adjustable by means of the spring 16 and the thumb screw 13 operating the lever 14 on the fulcrum 15. The bellows 17, 18 and 19 are arranged in an upper compartment of the casing over the dust receptacle compartment to operate in succession so that the suction is continuous, otherwise they require no particular description. The bellows 17, 18 and 19 respectively have the levers 20 attached thereto by means of the screws 21. The casing 1 has the projections 22 having the bearings 23 for the crank shaft 24, which has three cranks at substantially 120 degrees apart. To the crank shaft 24 are attached the sustaining wheels 25 and 26 having the corrugated periphery 27 and the pins 28 forming a bearing for the lower ends of the connecting rods 29, the other ends of which are movably connected with the outer ends of levers 20 attached to the bellows 17 and 19 respectively. The connecting rod 30 connects the crank shaft 24 and the lever 20 attached to the bellows 18. The wheels and crank shaft are located under the casing at the rear of the lower compartment and the operating connections are also housed within the casing. The handle 31 has the pivotal connection 32 with the casing 1.

33 is the cover. It will be noted that on account of locating the bellows in an upper compartment of the casing the wheels 25 and 26 at the end thereof, these elements are most compactly arranged so as to be covered by a small casing of simple outline.

34 is the surface over which the cleaner is operated.

In operating this device the parts being in the position shown in Figs. 1, 2 and 3, the operator by moving the device by means of the handle 31 over the surface 34, having adjusted the roller 12 by the thumb screw 13 so that the nozzle inlet 11 is at the desired height from the surface 34, the sustaining wheels 25 and 26 being set in motion by the friction of their corrugated periphery against the said surface 34, operate the said bellows 17, 18 and 19 in rotation by means of the levers 20 and the connecting rods 29 and 30, thereby creating a continuous and partial vacuum in the casing 1 and drawing the air together with what dust and small objects there may be upon the surface 34 through the elongated inlet 11 through the suction duct 10 and into the receptacle 5 which is constructed of such material as to retain the particles of dust and larger objects, and allowing the air to pass through the walls thereof through the apertures 2 into the said bellows 17, 18 and 19, respectively, the screen 3 guarding the said receptacle from being drawn into the said apertures 2.

Having thus described our invention what we claim is:—

1. In a vacuum cleaner, a casing having apertures, a nozzle head having an elongated inlet detachably connected with said casing, a dust receptacle in said casing detachably connected therewith, said nozzle head being provided with an opening therethrough from the said inlet and communicating with the dust receptacle, a screen guarding said apertures, a plurality of suction creating devices connected with the said casing above said apertures, an adjustable roller connected with said casing and adapted for vertical adjustment of one end thereof, a crank shaft movably connected with the said casing, sustaining corrugated wheels attached to the said crank shaft and connected with and adapted to operate said suction creating devices in rotation by the rotary motion of said wheels, a handle pivotally connected with the said casing, and a cover, all substantially as shown.

2. In a pneumatic sweeper the combination of a casing having apertures, a screen guarding said apertures, sustaining wheels connected with said casing, a dust collector in said casing detachably connected therewith, a nozzle head detachably connected with said casing and having an air passage therethrough from said dust receptacle widening into an elongated horizontal inlet therein, means for the vertical adjustment of said casing, and means for creating a continuous suction in said air passage through said dust receptacle connected with and automatically operated by the sustaining wheels.

3. A pneumatic cleaner comprising a casing open at its front end and having apertures, a screen guarding said apertures, a dust receptacle in said casing detachably connected therewith, a nozzle head detachably connected with said casing and covering the front end thereof, said nozzle head being provided with an opening therethrough communicating with said dust receptacle, a suction creating device connected with said casing, sustaining wheels connected with said casing and operatively connected with and automatically operating said suction device by their backward and forward travel over any surface, and means connected with the said casing for adjusting the elevation of the front end thereof.

4. A pneumatic cleaner comprising a casing opening at its front end, a dust receptacle in said casing detachably connected therewith, a nozzle head detachably connected with said casing and covering the open front end thereof and the open end of said dust receptacle to hold the dust receptacle in position, said nozzle being provided with an opening therethrough connecting with said dust receptacle, a suction creating device connected with said casing, and sustaining wheels connected with said casing and operatively connected with and operating said suction device by the backward and forward travel over any surface.

5. In a vacuum cleaner, the combination of a casing divided into lower and upper compartments, a dust receptacle in the lower compartment, a nozzle connected therewith and removable from the casing independently of said receptacle to expose the mouth thereof, a suction creating device in the upper compartment, operating wheels under the casing at the rear of the lower compartment and operating connections therefrom to the suction creating device which connections are arranged in said casing whereby all the operating parts are housed in said casing.

6. In a vacuum cleaner, the combination of a horizontal receptacle or compartment having an open mouth at one end, a dust receptacle having its open end located in said mouth and extending into said receptacle or compartment, and a nozzle head independent of said dust receptacle removably mounted over the end thereof to hold the end of the dust receptacle in position, said nozzle head having a passage communicating with the dust receptacle.

In testimony whereof we have hereunto set our hands, in the presence of two subscribing witnesses.

FRANK JULIUS QUIST.
MALCOLM BLANCH.

Witnesses:
C. FORREST WESSON,
MARY E. REGAN.